(12) United States Patent
Milyukov et al.

(10) Patent No.: US 11,533,464 B2
(45) Date of Patent: Dec. 20, 2022

(54) METHOD FOR SYNTHESIZING INTERMEDIATE VIEW OF LIGHT FIELD, SYSTEM FOR SYNTHESIZING INTERMEDIATE VIEW OF LIGHT FIELD, AND METHOD FOR COMPRESSING LIGHT FIELD

(71) Applicant: SAMSUNG ELECTRONICS CO., LTD., Suwon-si (KR)

(72) Inventors: Gleb Sergeevich Milyukov, Moscow (RU); Konstantin Viktorovich Kolchin, Moscow (RU); Aleksandr Vladislavovich Simutin, Moscow (RU); Michael Nikolaevich Rychagov, Moscow (RU); Sergey Alexandrovich Turko, Moscow (RU)

(73) Assignee: SAMSUNG ELECTRONICS CO., LTD., Suwoni-si (KR)

( * ) Notice: Subject to any disclaimer, the term of this patent is extended or adjusted under 35 U.S.C. 154(b) by 0 days.

(21) Appl. No.: 17/270,276

(22) PCT Filed: Aug. 20, 2019

(86) PCT No.: PCT/KR2019/010564
§ 371 (c)(1),
(2) Date: Feb. 22, 2021

(87) PCT Pub. No.: WO2020/040521
PCT Pub. Date: Feb. 27, 2020

(65) Prior Publication Data
US 2021/0314545 A1 Oct. 7, 2021

(30) Foreign Application Priority Data

Aug. 21, 2018 (RU) .......................... RU2018130343
Aug. 14, 2019 (KR) ........................ 10-2019-0099834

(51) Int. Cl.
*H04N 13/156* (2018.01)
*H04N 19/597* (2014.01)
(Continued)

(52) U.S. Cl.
CPC .......... *H04N 13/156* (2018.05); *G06N 3/063* (2013.01); *H04N 13/15* (2018.05); *H04N 13/161* (2018.05);
(Continued)

(58) Field of Classification Search
CPC .... H04N 13/156; H04N 13/15; H04N 13/161; H04N 13/282; H04N 19/597;
(Continued)

(56) References Cited

U.S. PATENT DOCUMENTS 5,613,048 A 3/1997 Chen et al.
7,466,336 B2 12/2008 Regan et al.
(Continued)

FOREIGN PATENT DOCUMENTS

CN 107430782 A 12/2017
EP 2 887 642 A2 6/2015
(Continued)

OTHER PUBLICATIONS

"Light field", Wikipedia, Last edited Jun. 13, 2019. (1 page total).
(Continued)

*Primary Examiner* — Tung T Vo
(74) *Attorney, Agent, or Firm* — Sughrue Mion, PLLC

(57) ABSTRACT

A method of synthesizing intermediate views of a light field includes selecting a configuration of specific input views of a light field collected by a light field acquiring device, specifying coordinates of intermediate views to be synthesized and inputting the specified coordinates to a neural network, and synthesizing intermediate views based on a scene disparity, a selected configuration of the specific input (Continued)

views, and the specified coordinates of the intermediate views, using a neural network.

11 Claims, 15 Drawing Sheets

(51) Int. Cl.
| | |
|---|---|
| H04N 13/15 | (2018.01) |
| H04N 13/161 | (2018.01) |
| H04N 13/282 | (2018.01) |
| G06N 3/063 | (2006.01) |
| H04N 13/00 | (2018.01) |

(52) U.S. Cl.
CPC ......... *H04N 13/282* (2018.05); *H04N 19/597* (2014.11); *H04N 2013/0081* (2013.01)

(58) Field of Classification Search
CPC ......... H04N 2013/0081; H04N 13/128; H04N 13/271; G06N 3/063; G06T 5/50; G06T 7/557; G06T 2207/20084; G06T 2207/20221; G06T 15/00
USPC .......................................................... 348/43
See application file for complete search history.

(56) References Cited

U.S. PATENT DOCUMENTS

| | | | |
|---|---|---|---|
| 7,493,037 B2 | 2/2009 | Inaba | |
| 8,325,220 B2 | 12/2012 | Ernst et al. | |
| 9,383,587 B2 | 7/2016 | Balogh | |
| 9,568,723 B2 | 2/2017 | Van Rooyen et al. | |
| 9,596,393 B2 | 3/2017 | Barros et al. | |
| 9,635,347 B2 | 4/2017 | May et al. | |
| 9,712,759 B2 | 7/2017 | Venkataraman et al. | |
| 9,826,216 B1 | 11/2017 | Hazeghi et al. | |
| 10,070,115 B2 | 9/2018 | Graziosi et al. | |
| 10,075,696 B2 | 9/2018 | Sabater et al. | |
| 2005/0185048 A1* | 8/2005 | Ha ....................... | H04N 13/282 348/42 |
| 2006/0268987 A1* | 11/2006 | Ha ........................ | H04N 19/51 375/240.16 |
| 2007/0229653 A1 | 10/2007 | Matusik et al. | |
| 2008/0198924 A1* | 8/2008 | Ho ....................... | H04N 19/577 375/240.01 |
| 2010/0231689 A1* | 9/2010 | Bruls .................... | H04N 13/161 348/43 |
| 2013/0215108 A1 | 8/2013 | McMahon et al. | |
| 2014/0092281 A1* | 4/2014 | Nisenzon ............. | H04N 13/111 348/262 |
| 2014/0161306 A1* | 6/2014 | Ma .......................... | G06T 5/006 382/103 |
| 2014/0232822 A1 | 8/2014 | Venkataraman et al. | |
| 2015/0201176 A1 | 7/2015 | Graziosi et al. | |
| 2016/0182891 A1 | 6/2016 | Ko et al. | |
| 2016/0209647 A1 | 7/2016 | Fursich | |
| 2016/0255333 A1 | 9/2016 | Nisenzon et al. | |
| 2016/0360177 A1 | 12/2016 | Graziosi et al. | |
| 2017/0347022 A1* | 11/2017 | Pettersson ............ | H04N 5/2624 |
| 2017/0374244 A1 | 12/2017 | Swaminathan et al. | |
| 2017/0374355 A1 | 12/2017 | Ko et al. | |
| 2018/0007347 A1 | 1/2018 | Ko et al. | |
| 2018/0047185 A1 | 2/2018 | Boisson et al. | |
| 2019/0066733 A1* | 2/2019 | Somanath ............. | G06T 3/0093 |
| 2019/0222821 A1 | 7/2019 | Graziosi et al. | |
| 2021/0209388 A1* | 7/2021 | Ciftci ................. | G06K 9/00718 |

FOREIGN PATENT DOCUMENTS

| | | |
|---|---|---|
| EP | 3 065 394 A1 | 9/2016 |
| EP | 3 264 755 A1 | 1/2018 |
| KR | 10-2015-0063010 A | 6/2015 |
| KR | 10-2016-0107265 A | 9/2016 |
| KR | 10-1723738 B1 | 4/2017 |
| RU | 2 411 690 C2 | 2/2011 |
| RU | 164158 U1 | 8/2016 |
| WO | 2010/037512 A1 | 4/2010 |
| WO | 2016/172385 A1 | 10/2016 |

OTHER PUBLICATIONS

"Optical flow", Wikipedia, Last edited Jan. 29, 2021. (4 pages total).
"Convolutional neural network", Wikipedia, Last edited Feb. 10, 2021. (6 pages total).
"Kinect", Wikipedia, Last edited on Dec. 12, 2020. (5 pages total).
Brownlee, Jason, "How to Use The Pre-Trained VGG Model to Classify Objects in Photographs", Nov. 8, 2017, Last Updated on Aug. 19, 2019, https://machinelearningmastery.com/use-pretrained-vgg-model-classify-objects-photographs/. (12 pages total).
Sahu, Anurag, "What is the VGG neural network", Mar. 2018, https://www.quora.com/What-is-the-VGG-neuralnetwork. (2 pages total).
Johnson, Justin, "Perceptual Losses for Real-Time Style Transfer and Super-Resolution", arXiv:1603.08155v1, [cs.CV], Mar. 27, 2016. (18 pages total).
Simonyan, Karen et al., "Very Deep Convolutional Networks for Large-Scale Image Recognition", arXiv:1409.1556v6, [cs.CV], Apr. 10, 2015. (14 pages total).
"Matrix norm", Wikipedia, last edited on Feb. 23, 2021, https://en.wikipedia.org/wiki/Matrix_norm#Frobenius_norm. (8 pages total).
Kalantari, Nima Khademi et al., "Learning-Based View Synthesis for Light Field Cameras", ACM Trans. Graph., vol. 35, No. 6, Article 193, Nov. 2016. (10 pages total).
Communication (Decision to Grant) dated Apr. 17, 2019 by the Russian Patent Office in Russian Patent Application No. 2018130343/08(049148).
Communication (Search Report) dated Apr. 17, 2019 by the Russian Patent Office in Russian Patent Application No. 2018130343/08(049148).
International Search Report and Written Opinion dated Nov. 28, 2019 by the International Searching Authority in International Patent Application No. PCT/KR2019/010564.

* cited by examiner

METHOD FOR SYNTHESIZING INTERMEDIATE VIEW OF LIGHT FIELD, SYSTEM FOR SYNTHESIZING INTERMEDIATE VIEW OF LIGHT FIELD, AND METHOD FOR COMPRESSING LIGHT FIELD

TECHNICAL FIELD

The disclosure relates to imaging, and more particularly, to a system for synthesizing intermediate light field views based on an input light field view.

BACKGROUND ART

A four-dimensional light field image generated by acquiring the amount of light traveling in various directions in space additionally includes information about light traveling directions compared to the existing two-dimensional image. Thus, the light field technology may perform various image processing such as refocusing image, three-dimensional depth information estimation, and the like, using the information.

Recently, the light field technology, that is, a technology for producing a set of images created from different views, has been widely spread and used for cameras and three-dimensional displays. Currently, a light field synthetic technology has been developed that increases the spatial-angle resolution of a light field and enables effective compression of the light field.

Modern devices that support the light field technology include special purpose light field generation cameras (also known as "plenoptic cameras") or 3D displays using light fields. These devices have several disadvantages that are difficult for general users to use. First, the plenoptic cameras are expensive, and are specialized to capture only an array of light field views. Second, the plenoptic cameras have a trade-off between a spatial resolution and an angular resolution. In other words, while the angular resolution is increased by creating more light field views with the plenoptic cameras, the spatial resolution for each individual view is decreased. Third, as a light field includes a huge amount of information, the light field needs to be effectively compressed to store the light field in a reproduction apparatus. Accordingly, an intermediate light field view synthesis system capable of performing high-quality and high-resolution imaging from a small number of input images of the light field is required. The light field view synthesis system may be applied to mobile devices such as smartphones, augmented and virtual reality devices, and high-productivity devices such as 3D displays or PCs.

DESCRIPTION OF EMBODIMENTS

Technical Problem

According to various embodiments of the disclosure, the number of input views needed to reconstruct a three-dimensional scene image is reduced.

According to various embodiments of the disclosure, the quality of a scene image may be increased by reducing defects of a synthetized light field view

Solution to Problem

To solve the above and other problems,
an embodiment of the disclosure provides a method of synthesizing intermediate views of a light field using a specific configuration of an input view of a light field collected by a light field acquiring device.

The intermediate view synthesis method includes selecting a configuration of specific input views of the collected light field, specifying coordinates of intermediate views to be synthesized and inputting the specified coordinates to a neural network, and synthesizing intermediate views, using the neural network, based on a scene disparity, a selected configuration of the specific input views, and the specified coordinates of intermediate view.

The configuration of the specific input views may be defined by coordinates of input view in a light field matrix collected by the light field acquiring device.

A size of the light field matrix may be M×M, where M is a positive number, and the coordinates of the input view may correspond to a point included in first and last rows and a point included in first and last columns of the light field matrix having the M×M size.

When the M is an odd number, the point may denote a middle point in the row or column, and when the M is an even number, the point may denote a point closest to a middle point in the row or column.

The coordinates of the intermediate view may be expressed by an integer or fraction.

The method may further include calculating a light field feature map based on the selected configuration of specific input views of the light field, and calculating the scene disparity using the neural network, based on the light field feature map The method may further include previously estimating the scene disparity by using a depth sensor.

The method may further include synthesizing intermediate views using a pre-trained neural network.

According to another embodiment,
there is provided a system for synthesizing intermediate views of a light field, the system including a light field view acquiring device configured to capture an input view of a light field scene, and a first convolutional neural network module configured to synthesize intermediate views based on an input view of the light field scene, a scene disparity, and specific coordinates of the intermediate views in a scene light field view array.

The system may further include a first calculation module configured to calculate a light field scene feature map based on the input view of the light field scene, a second convolutional neural network module configured to calculate a scene disparity based on the light field scene feature map, a disparity level setting module configured to set a disparity level set of $\{d_1, \ldots d_L\}$, a second calculation module configured to calculate a new view with respect to each disparity level using each input view through an equation below, and a third calculation module configured to calculate from respective generated views, a feature map indicating two characteristics of an average value of color and brightness of the pixel with respect to the disparity level.

$$L_{p_i}^{d_l}(s) = L_{p_i}[s + (p_i - q)d_l],$$

where $$L_{p_i}^{d_l}(s)$$

denotes a color value of a pixel at a positon of coordinates s=(x, y) obtained from N input views pi at a specific disparity level $d_l$.

The system may further include a depth sensor configured to provide a depth value used to previously estimate the disparity.

According to another embodiment, there is provided a mobile device including a system for synthesizing intermediate views of a light field, the system performing the above method of synthesizing intermediate views of a light field.

According to another embodiment, there is provided a method of compressing a light field, the method including selecting a configuration of specific input views of a light field collected by a light field acquiring device, synthesizing intermediate views of a light field using the method of synthesizing intermediate views of a light field, calculating a difference between at least one intermediate view and the input view, and compressing the difference.

The configuration of the specific input views may be defined by coordinates of input views in a light field matrix collected by the light field acquiring device.

Advantageous Effects of Disclosure

According to various embodiments of the disclosure, the number of input views needed to reconstruct a three-dimensional scene image may be reduced.

According to various embodiments of the disclosure, defects of a synthetized light field view may be reduced.

BRIEF DESCRIPTION OF DRAWINGS

Figure 4:
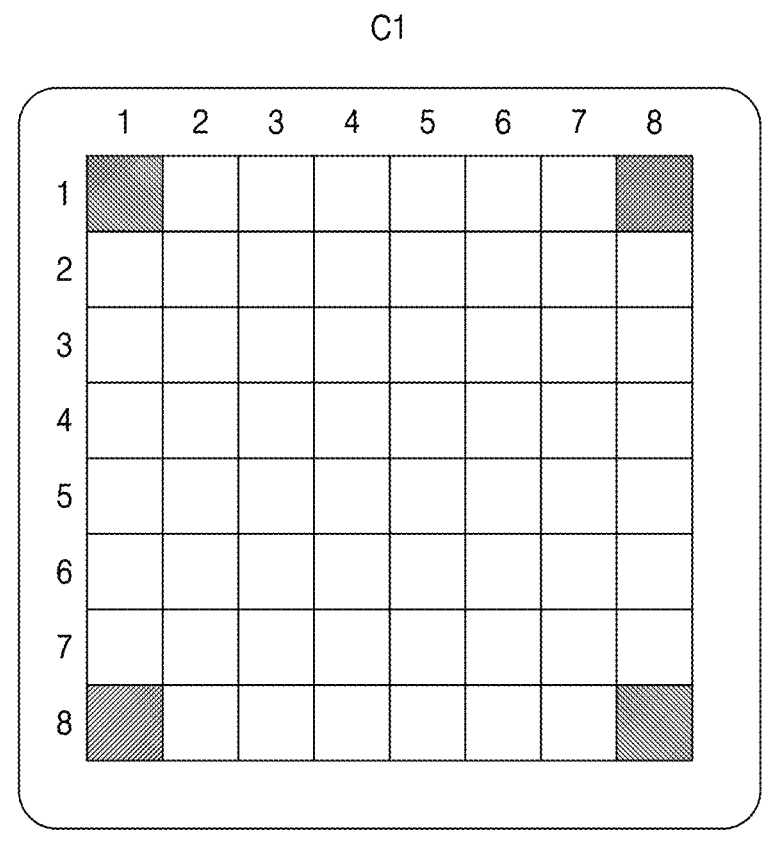

FIG. 4 schematically illustrates an exemplary configuration of input views.

FIG. 6 schematically illustrates an exemplary configuration of input views.

FIG. 9 schematically illustrates an exemplary configuration of input views.

FIG. 10 schematically illustrates an exemplary configuration of input views.

MODE OF DISCLOSURE

Figure 1:
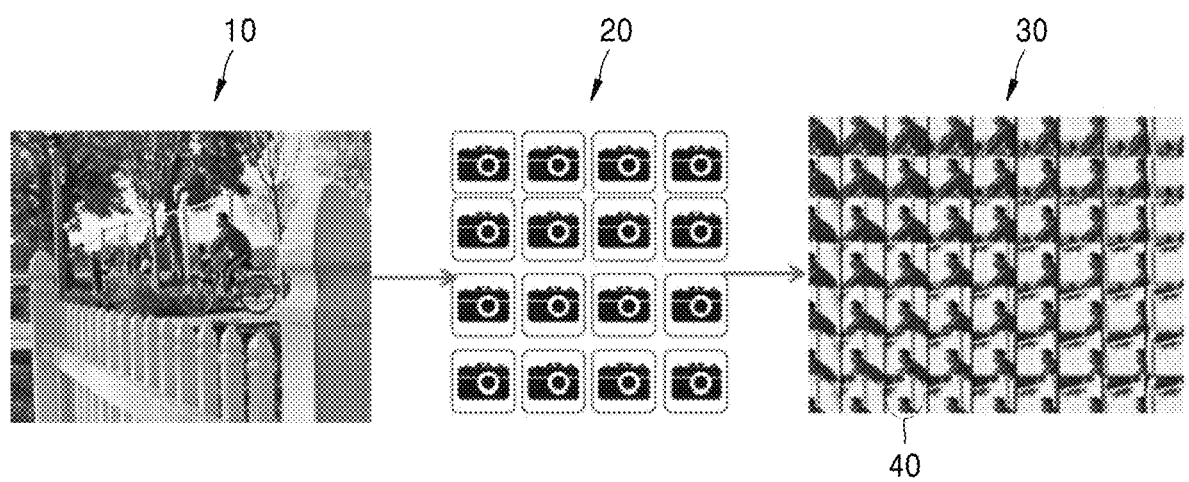
FIG. 1 schematically illustrates a process of acquiring a light field in a scene view array from various viewpoints by a camera array.

Hereinafter, a method of synthesizing intermediate views of a light field, a system for synthesizing intermediate views of a light field, and a method of compressing a light field according to various embodiments will be described in detail by explaining preferred embodiments of the disclosure with reference to the attached drawings. Throughout the drawings, like reference numerals denote like elements, and the sizes or thicknesses of components in the drawings may be exaggerated for convenience of explanation.

Terms such as "first" and "second" are used herein merely to describe a variety of constituent elements, but the constituent elements are not limited by the terms. Such terms are used only for the purpose of distinguishing one constituent element from another constituent element. A method of synthesizing intermediate views of a light field, a system for synthesizing intermediate views of a light field, and a method of compressing a light field may be implemented in various different forms, but not limited to the embodiments described herein.

Throughout the specification, when a part may "include" a certain constituent element, unless specified otherwise, it may not be construed to exclude another constituent element but may be construed to further include other constituent elements.

FIG. 1 schematically illustrates a process of acquiring a light field in a scene view array from various viewpoints by a camera array 20.

A "light field" means a function to describe the characteristics of light propagating through all points in a space in all directions. A light field image generated by acquiring the amount of light travelling in various directions in a space additionally includes information about the direction of light, unlike an existing two-dimensional image. Actually, a light field may be expressed by a view array 30 of slightly different scenes obtained by capturing a real scene 10 from various different viewpoints. In this case, a light field may be generated by using the camera array 20. Alternatively, a light field may be generated by using a micro lens array included in a plenoptic camera. In the view array 30 of scenes, one view 40 may include a plurality of pixels.

When two views are present with respect to the same scene, a difference between scene points forming an image in respective views may be estimated. For example, when two or more cameras capture a certain scene, one point in the scene is input as pixels at different positions in digital pictures of the two or more cameras. As such, a difference of one point to the same scene between different positions in respective cameras is called a disparity. For example, when position coordinates of a point in a left camera are (110, 100), position coordinates of a point in the right camera are (90, 100), and the position coordinates may be different from each other. A "depth", that is, a distance between respective points, may be calculated through the difference of positions of a point. A technology using the disparity has several demerits. For example, it is difficult to determine an accurate distance between cameras, and it is necessary to find a pixel of one view that accurately corresponds to a pixel of another view.

As a current disparity estimation technology tends to be inaccurate at a boundary between objects in an image, an intermediate view synthesized based on the technology may have a specific defect. A defect may be generated at a boundary between objects due to such a disparity calculation error. In this case, a defect may be noise having different depths at an edge of an object. In other words, pixels at a boundary of an object may be mixed in a fashion in which some of pixels of an image of one object are included in an image of another object.

A problem in the synthesis of a scene view using 2, 4, or 5 sets of input scene views may be solved by various embodiments of the disclosure using a disparity map. A disparity map shows how many pixels the respective pixels of input scene views to move to generate an appropriate intermediate view of a scene.

A disparity map to a specific view of a scene may be generated using information about the depth of each pixel of the specific view of a scene. The disparity map to a specific view of a scene is needed to generate a desired scene view. However, a classic disparity estimation method is inaccurate at a boundary in a view due to complexity in the estimation of a depth of each pixel in a scene view.

Figure 2:
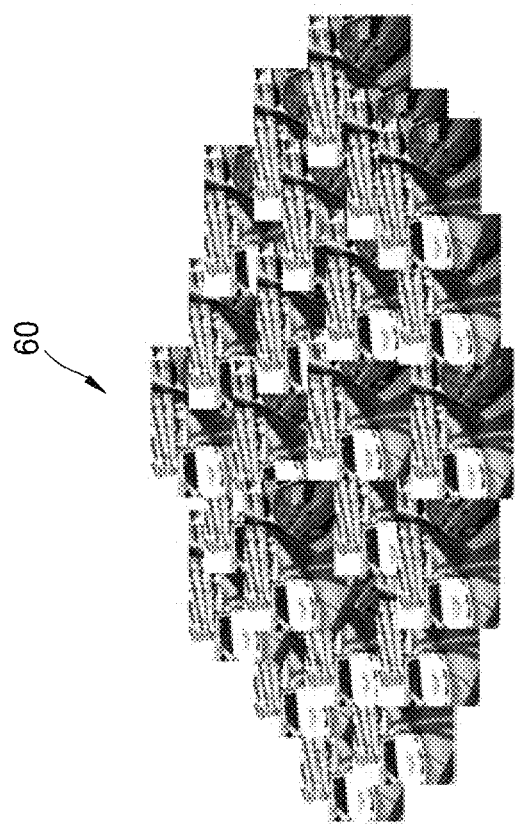
FIG. 2 schematically illustrates a process of generating an array of a certain-number of intermediate views based on a certain configuration of input views, according to an existing method.
Figure 2:
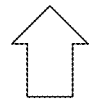
Figure 2:
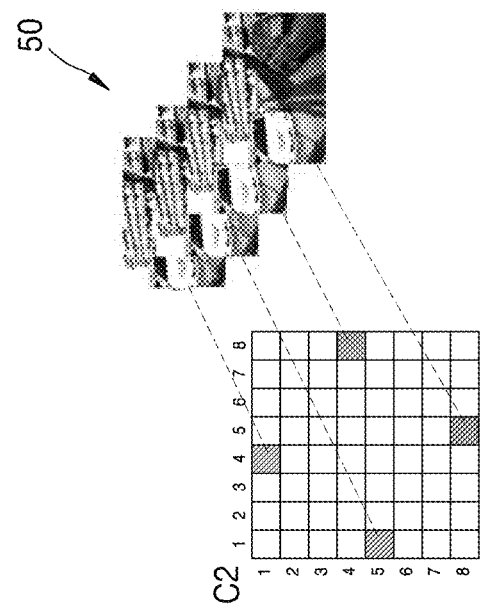

FIG. 2 schematically illustrates a process of generating an array 60 of a certain-number of intermediate views based on a certain configuration 50 of input views, according to an existing method.

Referring to FIG. 2, the array 60 of a certain-number of intermediate views may be generated by using the certain configuration 50 of input views obtained using a plenoptic camera, and the like.

Contrary to the classic view synthetic technology, various embodiments of the disclosure provide a method of synthesizing views using a neural network. For example, when the certain configuration 50 of input views is provided as an input value to a neural network, the neural network may generate the array 60 of a certain-number of intermediate views that are consecutive. In the following description, a method of synthesizing the array 60 of intermediate views using a neural network is described with reference to FIG. 3.

Figure 3:
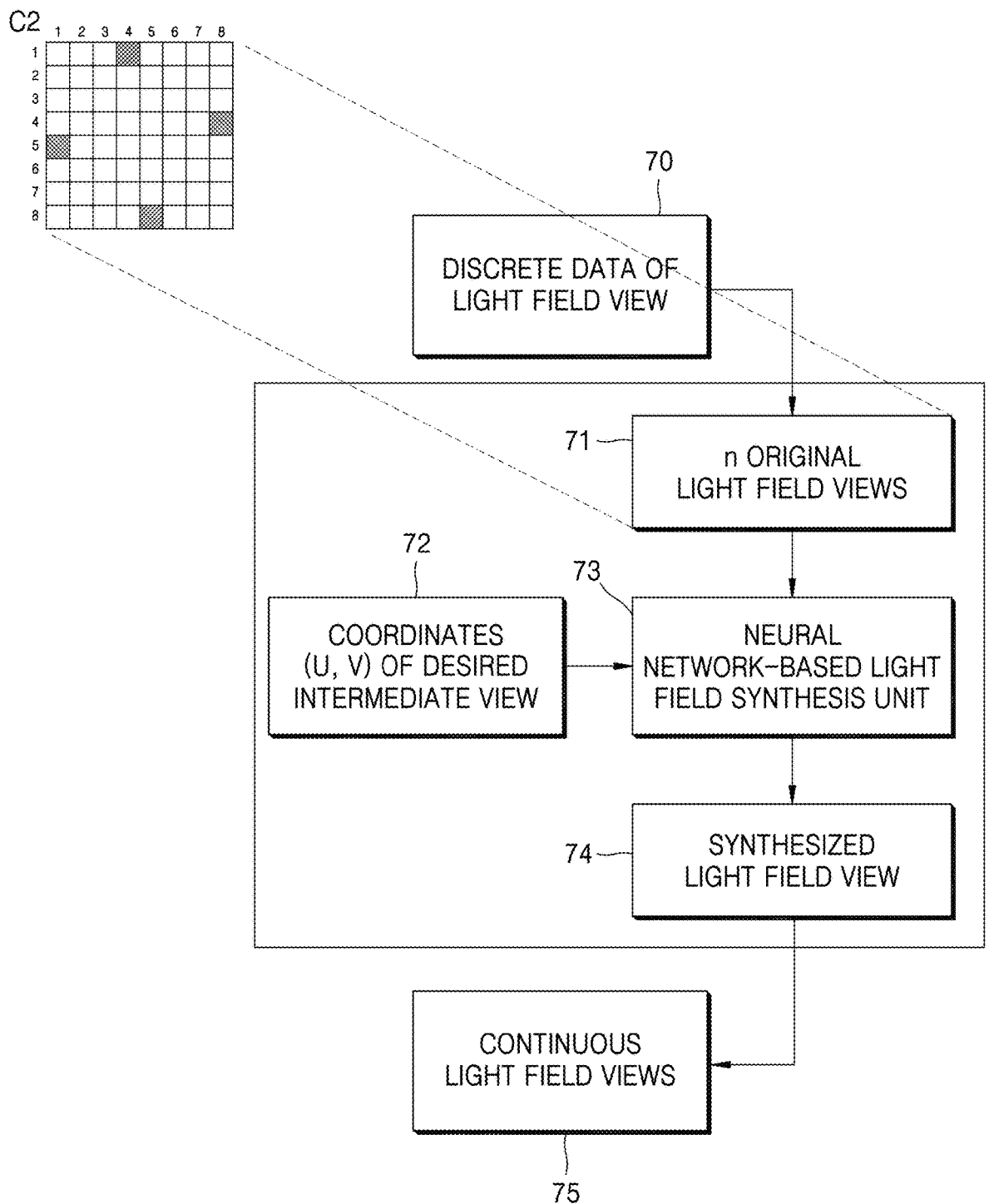
FIG. 3 schematically illustrates a method of synthesizing intermediate views using a neural network, according to an embodiment.

FIG. 3 schematically illustrates a method of synthesizing intermediate views using a neural network, according to an embodiment.

Referring to FIG. 3, a method of synthesizing intermediate views of a light field according to an embodiment may include selecting a configuration of specific input views of a light field collected by a light field acquiring device, specifying coordinates of intermediate views to be synthesized and inputting the specified coordinates to a neural network, and synthesizing intermediate views based on a scene disparity, the selected configuration of specific input views, and the coordinates of specified intermediate views, using a neural network.

When using the method of FIG. 3, the number of input views of a light field needed to synthesize intermediate views may be reduced compared to the conventional technology. FIG. 3 illustrates an exemplary configuration of input views of a light field. A detailed configuration of input views of a light field is described later with reference to FIGS. 4 to 10. A configuration of input views is determined by the coordinates of input views in a light field input view array (or matrix). The configuration of input views has a decisive effect on the quality of view synthesis throughout the whole scene. An appropriately selected configuration of input views may optimize the amount of information about an object in the depth and the scene. Furthermore, an appropriately selected configuration of input views may be helpful to adjust a defect due to an object image overlap.

Conventionally, views of a set of cameras at fixed positions are generated. However, according to the view synthesis method of the disclosure, views of cameras at all available positions may be synthesized. FIG. 3 illustrates a method of processing a configuration of input views of a light field. n original light field views 71, where n is a positive number, which are supplied to a system input by discrete data 70 of a light field input by a user, may be determined. Furthermore, coordinates 72 of intermediate views to be synthesized may be supplied to the system input. The coordinates 72 of intermediate views to be synthesized may be expressed by (u, v). All the data may be supplied to a neural network-based light field intermediate view synthesis unit 73. Furthermore, desired intermediate views may be generated as an output of the neural network-based light field intermediate view synthesis unit 73. Consecutive light field views 75 may be synthesized by variously specifying (u, v) that are the coordinates 72 of intermediate views to be synthesized.

An accessing method using a neural network may be used to correct the calculation of a disparity. In particular, a user may train a neural network to generate a disparity map for reducing a view synthesis error.

FIG. 3 illustrates a method of synthesizing a certain number of intermediate views based on an input view of a certain configuration, for example, a configuration C2. Furthermore, FIG. 3 shows that, while a light field, that is, the original light field 71, generated through a plenoptic camera consists of discontinuous views of a light field, a synthetized light field, that is, the consecutive light field views 75, is a space of continuous views of a light field.

The intermediate view is described below. Assuming that the coordinates of each input view in a light field array are (1, 1), (1, 7), (7, 7), and (7, 1), an intermediate view of certain coordinates, for example, (4, 5), in an area surrounded by the coordinates of input views may be synthesized. However, the disclosure is not limited thereto, and coordinates specified to intermediate views of a light field synthesized through a neural network may have a value, for example, (4.1, 5.2), that is not an integer.

A convolutional neural network (CNN) may consider a spatial structure of a scene and may correctly process overlap of objects having various depth levels in a view. A light field synthesis method according to the intermediate view synthesis method of FIG. 3 may generate any view by reducing a defect of objects overlapped in a continuous view space. This may be performed by supplying, to a neural network, coordinates of a desired view to be generated in a light field view matrix. The coordinates of a desired view may be arbitrarily specified. In other words, the coordinates of a desired view may be selected from coordinate values in a continuous range, not from the light field coordinate set generated by a plenoptic camera.

FIGS. 4 to 10 schematically illustrates configurations C1 to C7 of exemplary input views.

A configuration of an input view may include a symmetrical structure. An input view symmetrical configuration may be suitable for a neural network to reduce a defect and reconstruct a desired light field. As such, the configuration of input views of a light field may have various structures and numbers.

An input view configuration C1 is disclosed in a thesis (Nima Khademi Kalantari, Ting-Chun Wang, and Ravi Ramamoorthi. 2016. Learning-based view synthesis for light field cameras. ACM Trans. Graph. 35, 6, Article 193 (November 2016), 10 pages). The input view configuration C1 is a configuration selected from an edge corner end of the light field view matrix, which has the most numerous defects among the configurations C1 to C7.

Figure 5:
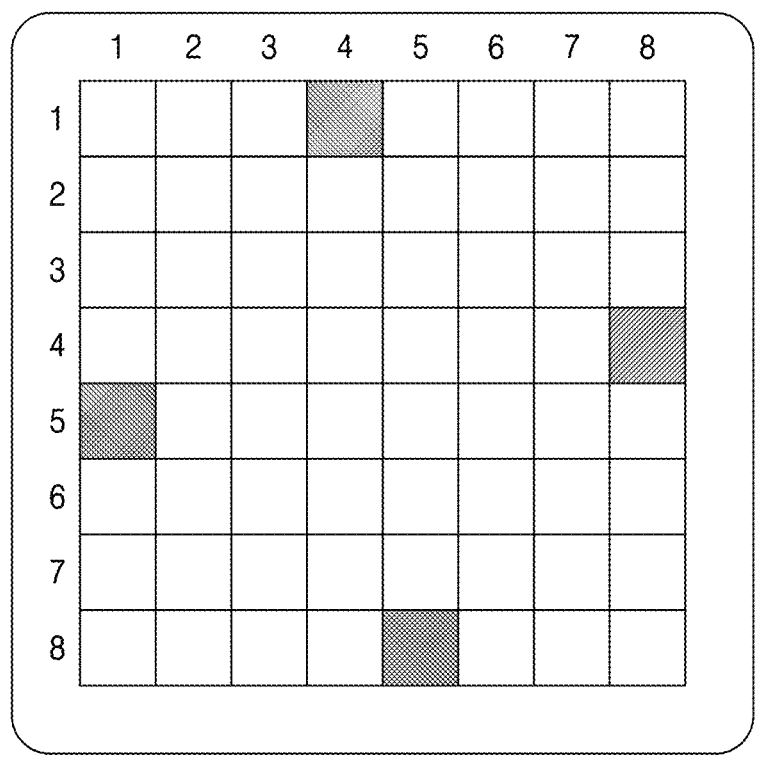
FIG. 5 schematically illustrates an exemplary configuration of input views.

Referring to FIG. 5, an input view configuration C2 consists of views located at coordinates (4, 1), (8, 4), (1, 5), and (5, 8) in a light field array of input views having a certain fixed 8×8 size.

Figure 6:
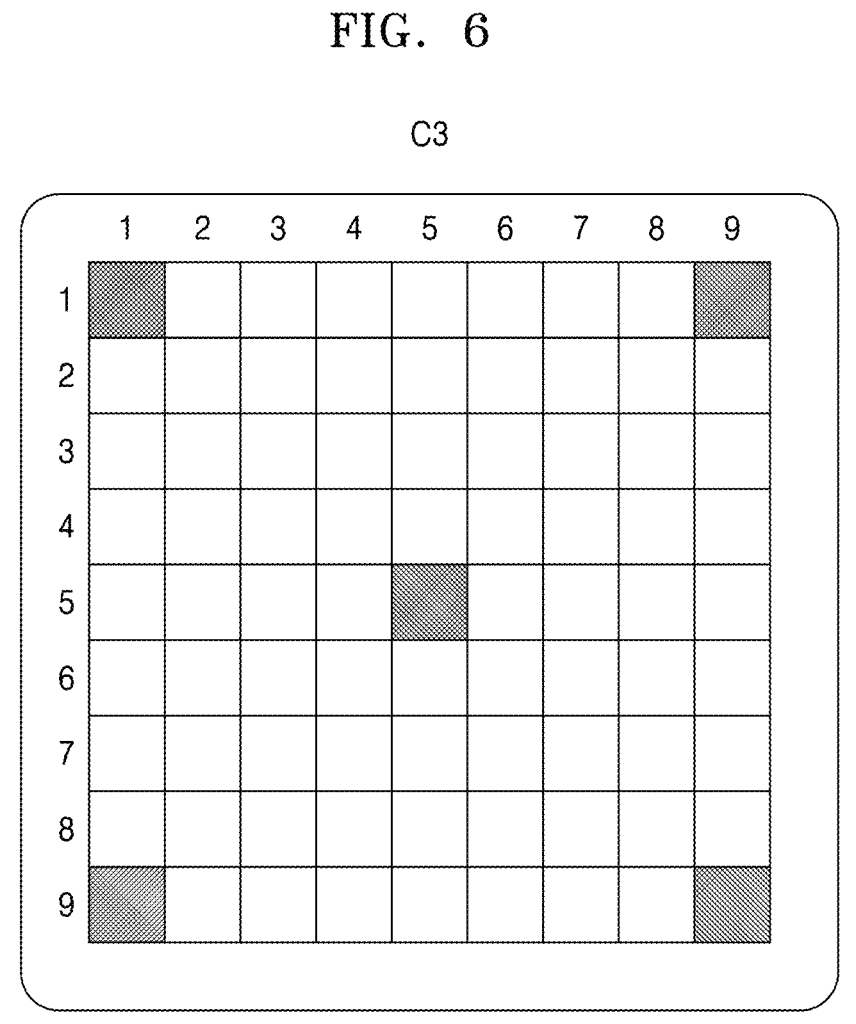

Referring to FIG. 6, an input view configuration C3 consists of views located at coordinates (1, 1), (1, 9), (9, 1), (9, 9), and (5, 5) in a light field array of input views having a certain fixed 9×9 size. The configuration has a merit when there is a need to synthesize views arranged close to an input view inside a rectangle formed by the input views.

Figure 7:
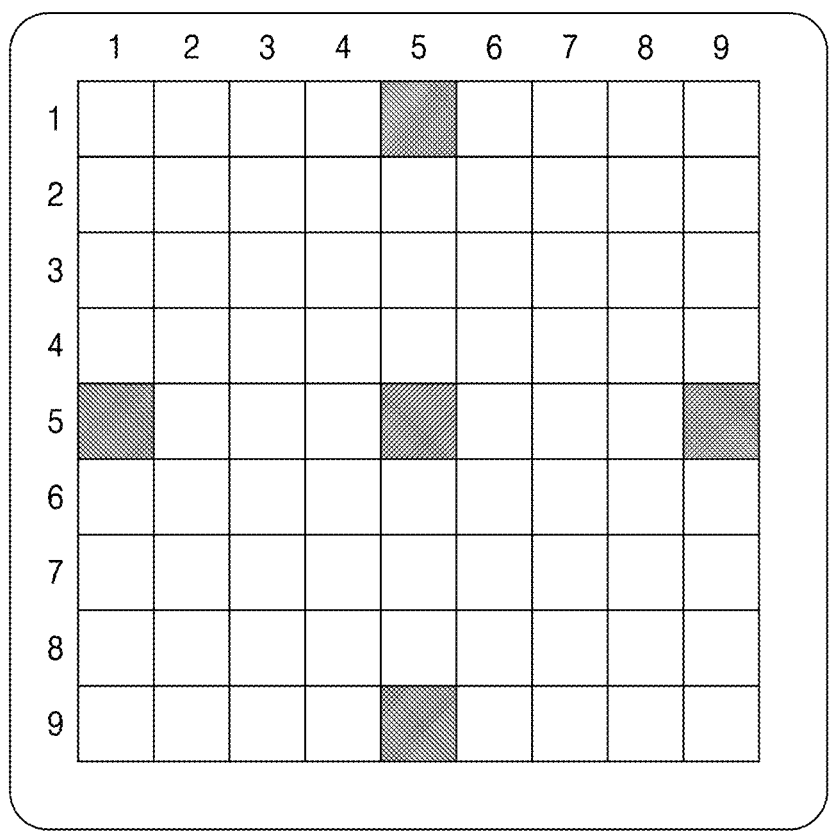
FIG. 7 schematically illustrates an exemplary configuration of input views.

Referring to FIG. 7, an input view configuration C4 consists of views located at coordinates (5, 1), (1, 5), (5, 9), (9, 5), and (5, 5) in a light field array of input views having a certain fixed 9×9 size.

Figure 8:
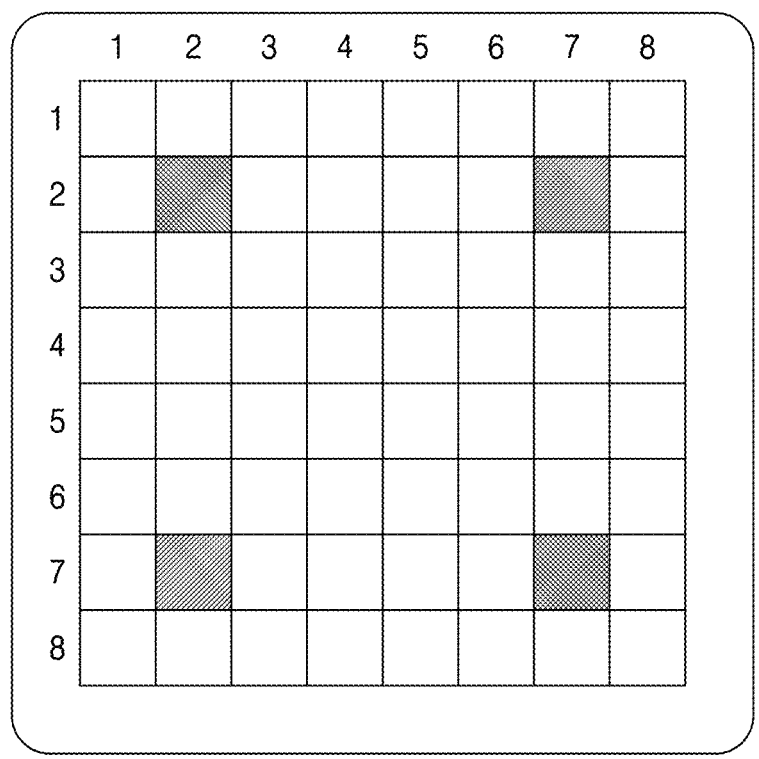
FIG. 8 schematically illustrates an exemplary configuration of input views.

Referring to FIG. 8, an input view configuration C5 consists of views located at coordinates (2, 2), (2, 7), (7, 2), and (7, 7) in a light field array of input views having a certain fixed 8×8 size. The configuration has a merit when there is a need to synthesize views arranged close to an input view inside or outside a rectangle formed by the input views.

Figure 9:
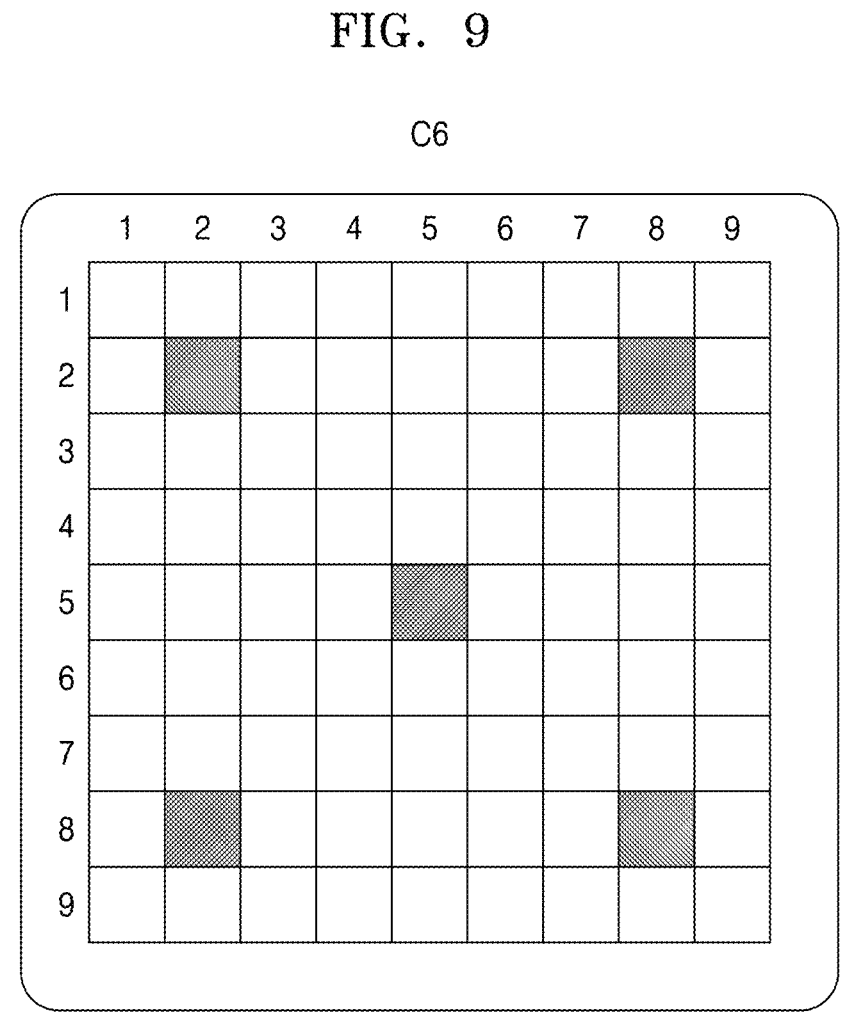

Referring to FIG. 9, an input view configuration C6 consists of views located at coordinates (2, 2), (2, 8), (8, 2), (8, 8), and (5, 5) in a light field array of input views having a certain fixed 9×9 size. The configuration has a merit when there is a need to synthesize views arranged close to an input view inside or outside a rectangle formed by the input views.

Figure 10:
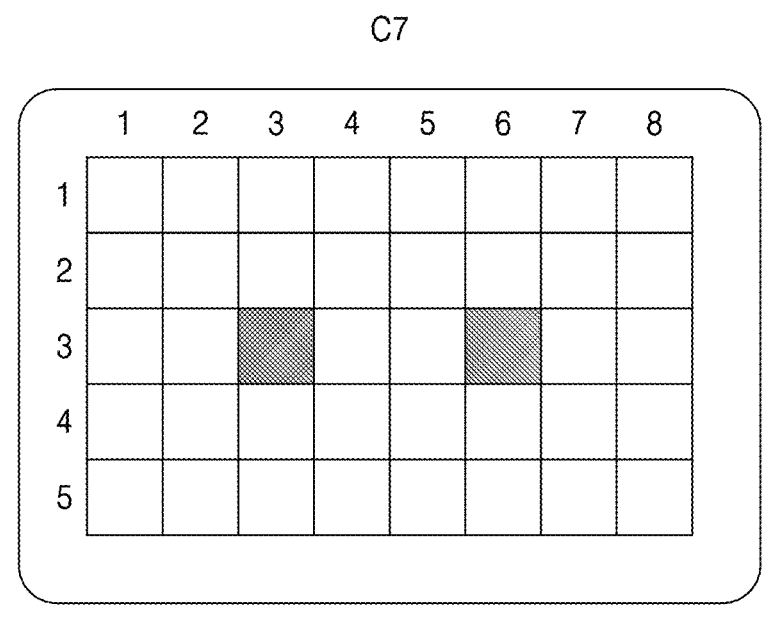

Referring to FIG. 10, an input view configuration C7 consists of views located at coordinates (3, 3) and (6, 3) in a light field array of input views having a certain fixed 5×8 size. The input view configuration C7 has a merit of having only two configurations. The input view configuration C7 considers a variance that intermediate views are synthesized based on only two views of an initial light field. The configuration C7 may be used when, for example, two smartphone cameras are used.

Among input view configurations to an array of a light field of a certain M M size, where M is a positive number, the configuration C2 has the best result in terms of the quality of a synthetized view, compared to the configuration C3, the configuration C4, and the configuration C5. The input view configuration has a decisive effect on the quality of view synthesis through the whole scene. An appropriately selected input view configuration may optimize the amount of information about the depth and scene objects. Furthermore, the appropriately selected input view configuration may be helpful to adjust a defect due to an object image overlap.

As a distance to move to pixel considering a disparity decreases, the quality of a synthetic image increases. Thus, the quality of a synthetic image is determined by a distance from a view being considered to the nearest input view. When the distance is calculated with respect to an intermediate view generated using the input view configurations C1 and C2, as the distance in the input view configuration C2 is less than the distance in the input view configuration C1, a case of using the configuration C2 may have higher synthetic image quality than a case of using the configuration C1.

An optimized configuration, for example, the configuration C2, of specific input views from a light field array of an M×M size, where M is a positive number, may be determined by coordinates corresponding to a certain point in the first and last rows in the light field array and a certain point in the first and the last columns. In this case, when M is an odd number, the certain point may denote a middle point in a row or a column, and when M is an even number, the certain point may denote a point closest to a middle point in a row or a column.

A system for synthesizing intermediate views of a light field according to an embodiment of the disclosure may be used to implement a part of an algorithm for compression of a light field to reduce resource costs during the data transmission in a data transmission network.

Figure 11:
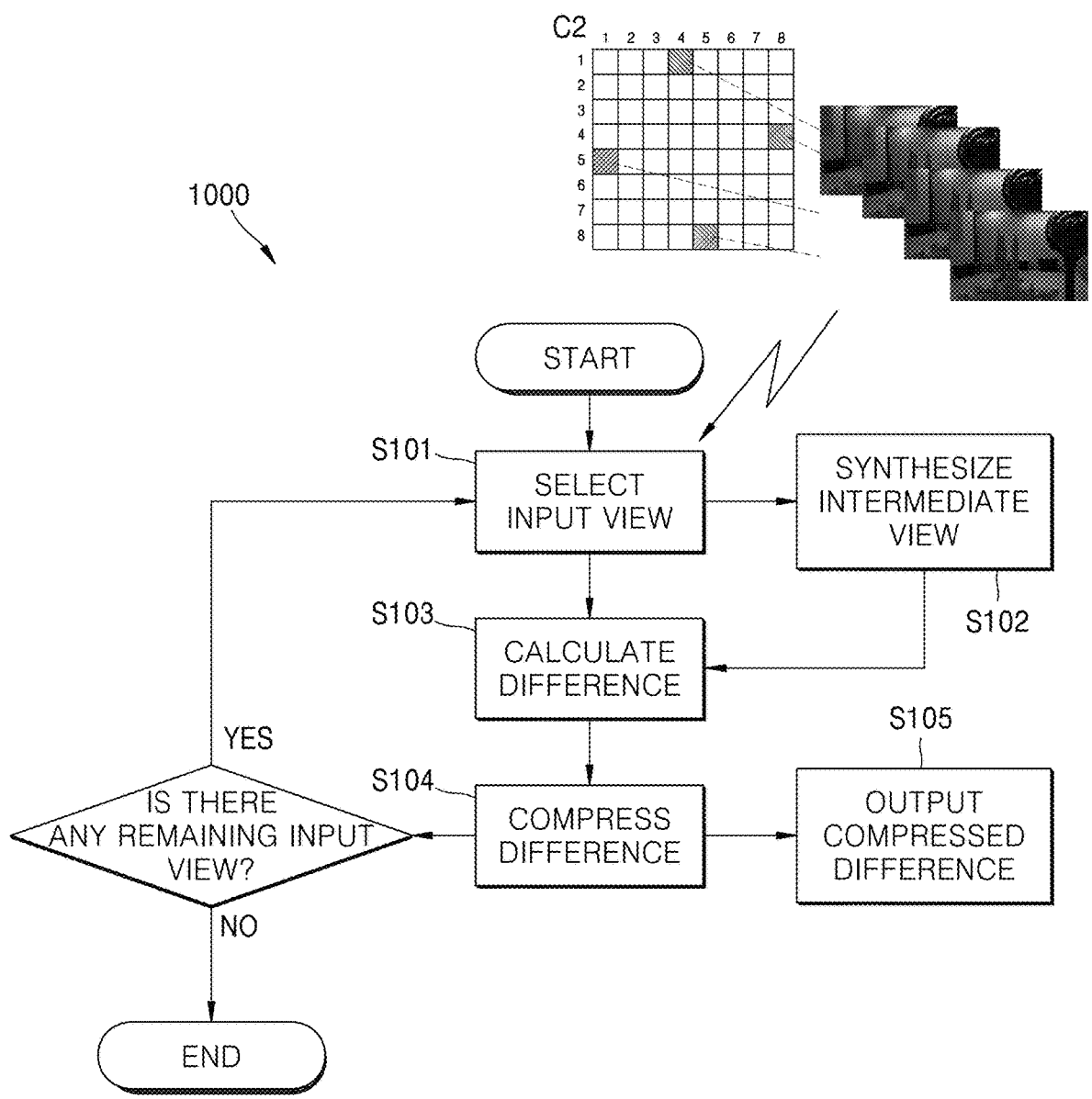
FIG. 11 schematically illustrates a light field compression algorithm according to an embodiment.

FIG. 11 schematically illustrates a light field compression algorithm 1000 according to an embodiment.

The compression algorithm 1000 may include selecting an input view (S101), synthesizing intermediate views using a selected input view (S102), calculating a difference between an input view and an intermediate view (S103), compressing a calculated difference (S104), and outputting a compressed difference (S105).

In the operation of selecting the input view (S101), only a view corresponding to the configuration C2 of input views of a light field may be selected as an input view. However, the disclosure is not limited thereto, and the input view configuration may be various. The selected input view may be provided to a current view unit. The current view unit may transmit the selected input view to a view processing unit.

In the operation of synthesizing intermediate views using the selected input view (S102), desired intermediate views may be synthesized through the view processing unit using the method described with reference to FIGS. 1 to 3. For example, in the operation of synthesizing intermediate views using the selected input view (S102), desired intermediate views may be synthesized based on the specific input views, using a neural network.

In the operation of calculating a difference between an input view and an intermediate view (S103), a difference between the input views of a light field and the intermediate view may be calculated using a difference calculation unit.

In the operation of compressing a calculated difference (S104), the difference calculated in the operation of calculating a difference between an input view and an intermediate view (S103) may be compressed by a well-known transformation method such as discrete cosine transform (DCT).

In the operation of outputting a compressed difference (S105), the difference compressed in the operation of compressing a calculated difference operation of compressing a calculated difference (S104) may be output. In this case, when an input view that is not processed and remains exists, the algorithm goes back from the operation of compressing a calculated difference (S104) to the operation of selecting the input view (S101). Contrary to the above, when an input view that is not processed no longer exists, the compression algorithm 1000 is terminated.

Figure 12:
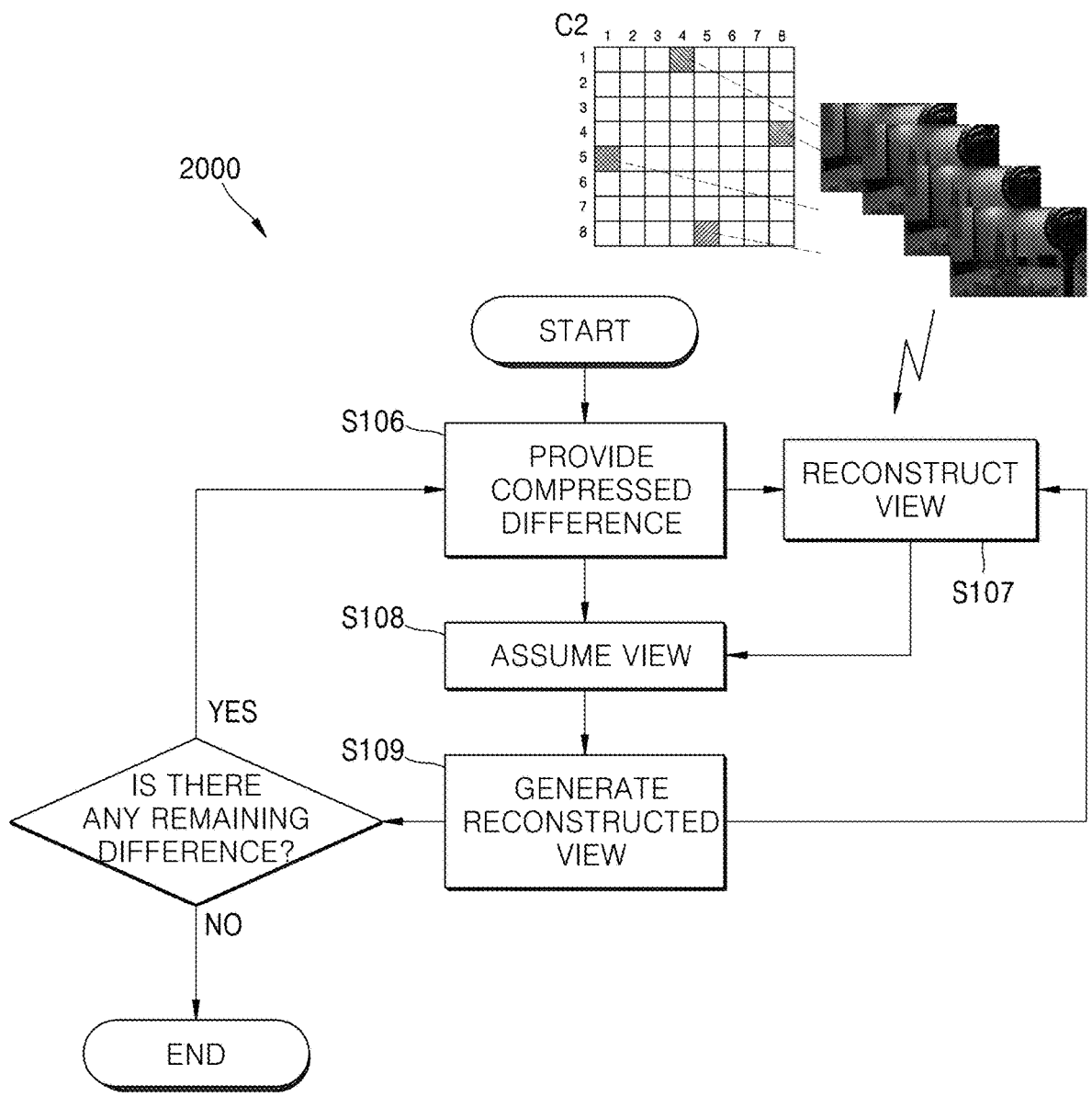
FIG. 12 schematically illustrates a compressed light field reconstruction algorithm according to an embodiment.

FIG. 12 schematically illustrates a compressed light field reconstruction algorithm 2000 according to an embodiment.

The light field reconstruction algorithm 2000 may include providing a difference compressed through the compression algorithm 1000 of FIG. 11 to a current difference unit (S106), reconstructing a view using the compressed difference and the input view (S107), assuming a view (S108), and generating a reconstructed view (S109).

In the operation of providing compressed difference (S106), the difference compressed in the compression algorithm 1000 may be transmitted to the current difference unit. For example, the compressed difference may be transmitted to the current difference unit until reconstruction to all input views of a light field is completed.

The operation of reconstructing the view (S107) may include reconstructing a coefficient to reconstruct a difference between the synthetized intermediate view and the input view. The input view may be the same as the input view selected in the operation of selecting the input view (S101) of the compression algorithm 1000 of FIG. 11. Furthermore, the operation of reconstructing the view (S107) may include performing inverse transformation on the difference transformed using the view reconstruction unit. For example, the inverse transformation may be performed on the compressed difference through DCT by using the view reconstruction unit in the operation of compressing a calculated difference (S104) of FIG. 11.

The operation of assuming the view (S108) may include summing a result value of the coefficient and the inverse transformed difference obtained in the operation of reconstructing the view (S107) with a light field view synthetized by a neural network. The operation of summing may be performed by an assumed view unit.

In the operation of generating a reconstructed view (S109), a view may be reconstructed using the view assumed in the operation of assuming the view (s108). Furthermore, after completing reconstruction for all input views of a light field using a system for synthesizing intermediate views of a light field to reconstruct all intermediate views based on the reconstructed input views of the light field, the reconstructed views are generated and then unprocessed input views of a light field may be processed.

Figure 13:
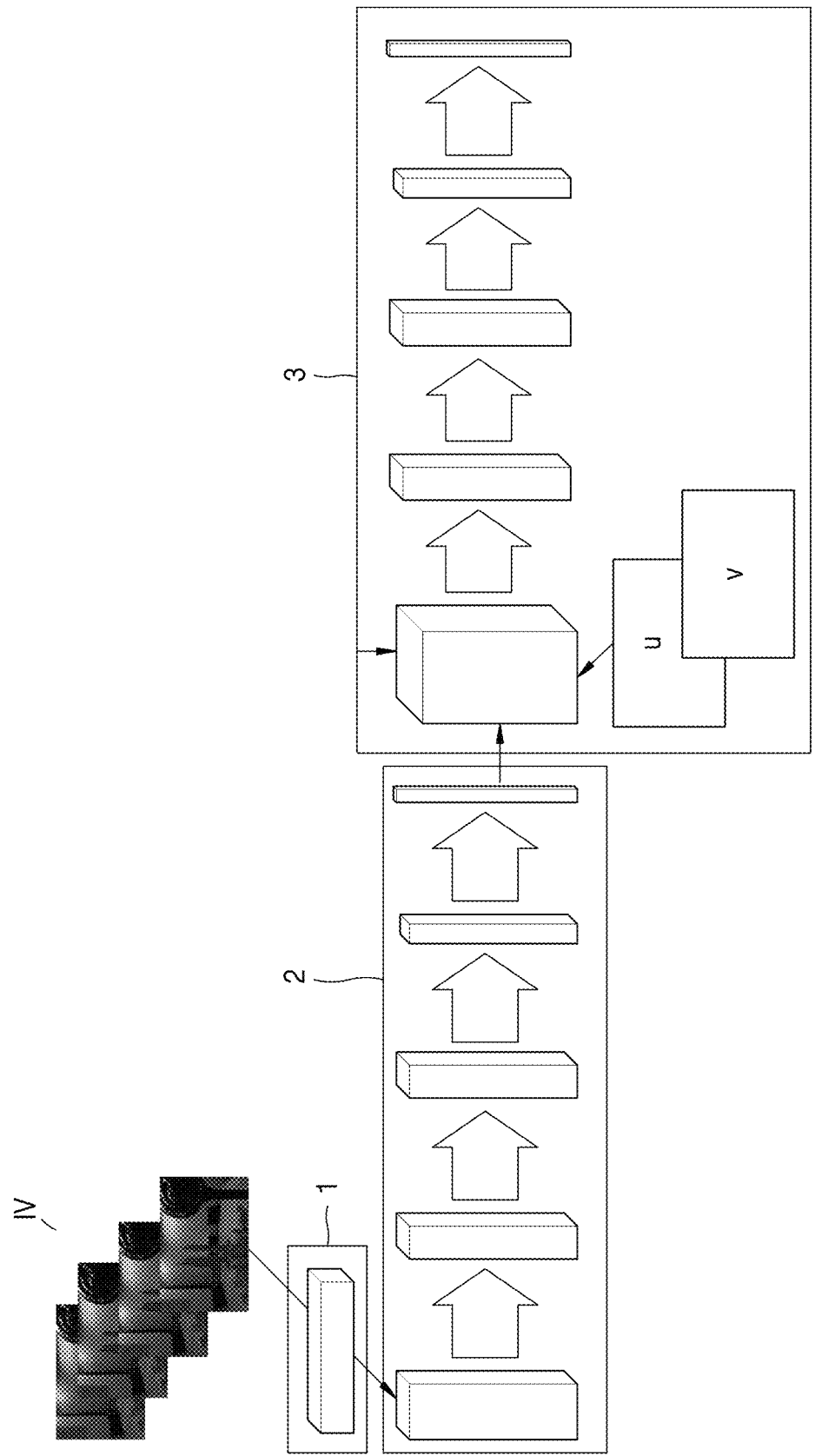
FIG. 13 schematically illustrates a system for synthesizing intermediate views of a light field using a neural network, according to an embodiment.

FIG. 13 schematically illustrates a neural network system 3000 for synthesizing intermediate views of a light field using a neural network, according to an embodiment. The neural network system 3000 of FIG. 13 may use the input view configurations C2 to C7 of FIGS. 5 to 10.

Referring to FIG. 13, neural network system 3000 may include a first calculation module 1 for calculating a light field scene feature array based on input views IV of a scene light field, a first convolutional neural network module 2 for calculating a scene disparity based on the feature array calculated by the first calculation module 1, and a second convolutional neural network module 3 for synthesizing intermediate views based on the scene disparity calculated by the first convolutional neural network module 2, the input views IV of a light field, and coordinates of the intermediate view in a scene light field view array.

The first calculation module 1 may calculate the light field scene feature array based on the input view IV. The feature array may be referred to as a feature map. The features may be immediately provided as basic information of an unprocessed disparity to a neural network. One of the input views may be shifted 21 times by 1 pixel relative to itself. Such shift may be performed on all input views configurations having 2, 4, or 5 views. Then, the mean and variance may be calculated and obtained from the shifted input view. The averaged view may be obtained by adding the pixel values of the views and dividing the added values by the number of views. The variance may be calculated from the average. For example, the averaged view may be calculated as follows. First, it may be assumed that two pixels respectively having color values of (200, 200, 20) and (200, 0, 50) are in one view and that two pixels with color values are in another view. To generate color values of (400, 250, 20) and (220, 100, 250), the color values of the two views may be summed. To generate an averaged view, all pixel values may be divided by 2 that is the number of used views, and accordingly, an averaged view having pixels having values of (200, 125, 10) and (110, 50, 125) may be provided.

The feature map may be calculated by the following method. First, a vector s including coordinates (x, y) of a pixel and a vector q indicating a position of an intermediate view in the light field view matrix and including coordinates (u, v) in a two-dimensional space may be defined. Furthermore, a vector pi indicating a position of an i-th input view may be defined. The vector pi may include the coordinates (u, v) in a two-dimensional space. In other words, q and pi may be vectors in the same space. Then, when a disparity map Dq(s) about a pixel of a new view of the vector is known (the disparity map Dq(s) is calculated by a neural network), the color value of a pixel located at a position s may be defined by Equation (1) below.

$$L_{p_i}(s) = L_{p_i}[s + (p_i - q)D_q(s)] \qquad \text{Equation (1)}$$

To generate a feature map, a disparity level set may be specified. For example, a disparity level may be that $d_l$=l-22 (l=1, ..., 43).

A new view may be calculated through Equation (2) below with respect to each disparity level using each light field view.

$$L_{p_i}^{d_l}(s) = L_{p_i}[s + (p_i - q)d_l]L_{p_i}^{d_l}(s) \qquad \text{Equation (2)}$$

may mean the color value of a pixel located in the position of coordinates s=(x, y) obtained from N input views $p_i$ at the specified disparity $d_l$.

Next, two feature maps may be calculated for each disparity level. An average value of a pixel between respectively generated views may be calculated by Equation (3) below. A pixel value may be defined by color and brightness of a pixel. A pixel value L may mean a number triplet Lc, where c has values of 1, 2, and 3. For example, $L_1$, $L_2$, and $L_3$ may mean red, green, and blue, respectively. Lc may have a value in a range of 0 to 2N, where N often denotes 8. Furthermore, the variance may be obtained from the average. The number of new views generated with respect to the specified disparity may be the same as the number of input views.

$$M^{d_l}(s) = \frac{1}{N}\sum_{i=1}^{N} L_{p_k}^{d_l}(s) \qquad \text{Equation (3)}$$

$$M^{d_l}(s)$$

is an image generated by average input images shifted according to Equation (2). Thus, $$M^{d_l}(s)$$

may mean an average value of pixels obtained from the N times shifted image. The pixel is located on the vector s at the specified disparity level $d_l$, and may be calculated from the N input views.

A standard deviation $$V^{d_l}(s)$$

of a color value to a pixel that is calculated from N input views, and located on the vector s at the specified disparity level $d_l$ may be calculated by Equation (4) below.

$$V^{d_l}(s) = \sqrt{\frac{1}{N-1} \sum_{i=1}^{N} \left( L_{p_i}^{d_l}(s) - M^{d_l}(s) \right)^2} \quad \text{Equation (4)}$$

Furthermore, a feature map having a 2L depth of a structure such as $$\{M^{d_1}(s), V^{d_1}(s), \ldots, M^{d_L}(s), V^{d_L}(s)\};$$

through the average value $M^{d_i}(s)$ of a pixel and the standard deviation $V^{d_i}(s)$ of color values of pixels may be formed. In other words, a matrix having a size matching a standard deviation to each disparity level [d1, dL], L=21 and a resolution of an input view including an averaged image may be generated by Equation (3). The number of disparity levels may be experimentally determined. Actually, as 0 level is included, the feature map may have a 2L+1 depth.

A disparity level L may correspond to a value obtained by adding one level corresponding to input levels, that is, views without a shift, to 21 view shifts in a positive or negative direction by each pixel, and as there are two features, 43 (2×21+1) disparity levels L may be supplied as an input of a neural network for estimating a scene disparity. The two features may mean the averaged image by Equation (3) and the standard deviation by Equation (4).

In other words, the feature map of a tensor having a size of W×H×2L in a pixel may be supplied as an input of a neural network. W and H may respectively mean the width and height of a view.

The feature map may mean a matrix (a matrix including a three-dimensional tensor) set depicting a behavior of input views in a process in which input views are shifted towards a required view. Thus, the neural network may include self-adjusting characteristics, and itself may create a necessary hierarchy of abstract features (a sequence of feature maps) to discriminate the essentials by filtering omissible items.

The neural network system 3000 for synthesizing intermediate views according to another embodiment of the disclosure may synthesize desired intermediate views of light field. The first and second convolutional neural modules 2 and 3 included in the neural network system 3000 may be trained together.

The first convolutional neural network module 2 calculates a disparity. The second convolutional neural network module 3 directly synthesizes desired intermediate views. The three-dimensional tensor that is stackable from a set of input views of a light field may be transformed by Equation (2) with taking into account the disparity map received from the first convolutional neural network module 2. The three-dimensional tensor may include a disparity map and two matrices. All elements of one of the two matrices may match the coordinates of a desired view on an x-axis (indicated to be u), and all elements of the other of the two matrixes may match the coordinates of a desired view on a y-axis (indicated to be v).

Figure 14:
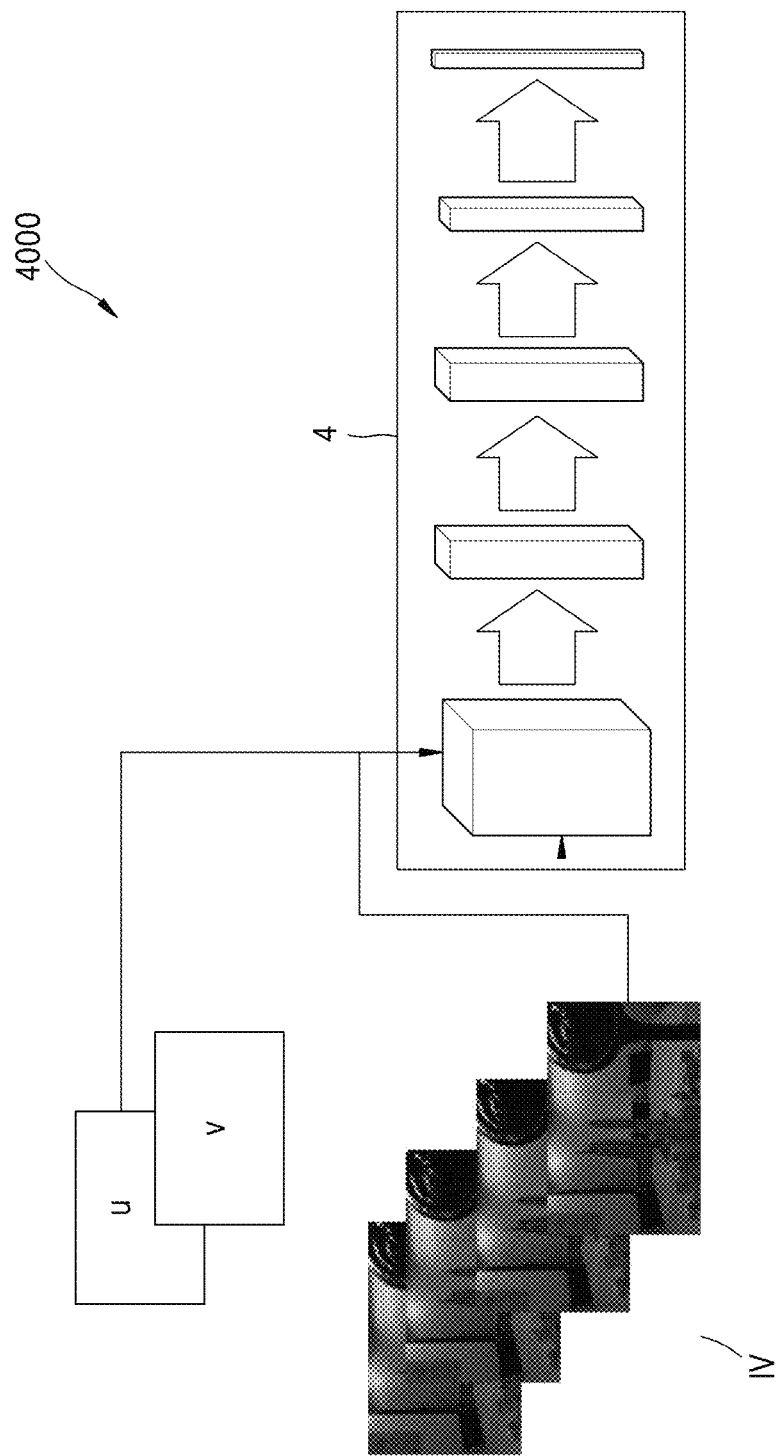
FIG. 14 schematically illustrates a system for synthesizing intermediate views of a light field using a neural network, according to another embodiment.

FIG. 14 schematically illustrates a neural network system 4000 for synthesizing intermediate views of a light field using a neural network according to another embodiment. The neural network system 4000 may synthesize intermediate views without using a feature map. The neural network system 4000 of FIG. 14 may use the input view configurations C1 to C7 of FIGS. 4 to 10.

It is the essence of the neural network system 4000 to supply the input view IV and the coordinates (u, v) of a desired view as an input of a neural network and output a necessary intermediate view. In this case, a disparity may be estimated not using a neural network, but using a depth sensor (not shown). The depth sensor, which is not illustrated in FIG. 14, may be provided as an additional device for providing a depth map. The technology related to the depth sensor is a conventionally well-known technology (cf., https://ru.wikipedia.org/wiki/Kinect). The neural network system 4000 may include a convolutional neural network module 4 for synthesizing intermediate views based on the scene disparity map generated, using the depth sensor, with respect to the input views IV of a scene light field, and the coordinates (u, v) of the intermediate view in a scene light field view array.

Thus, in the neural network system 4000, unlike the neural network system 3000 of FIG. 13, there is no need to calculate a feature map and use a neural network to calculate a scene disparity. However, the structure of the neural network system 4000 may be similar to the structure of the neural network system 3000 of FIG. 13. In detail, the selected input view IV may be transformed by Equation (2) with reference to the disparity map received from the depth sensor. Furthermore, a transformed input view may be supplied to the convolutional neural network module 4 for the synthesis of a desired view. Furthermore, the transformed input view may include the disparity map from the depth sensor and two matrices. All elements of one of the two matrices may match the coordinates of a desired view on the x-axis (indicated to be u), and all elements of the other of the two matrices may match the coordinates of a desired view on the y-axis (indicated to be v).

Figure 15:
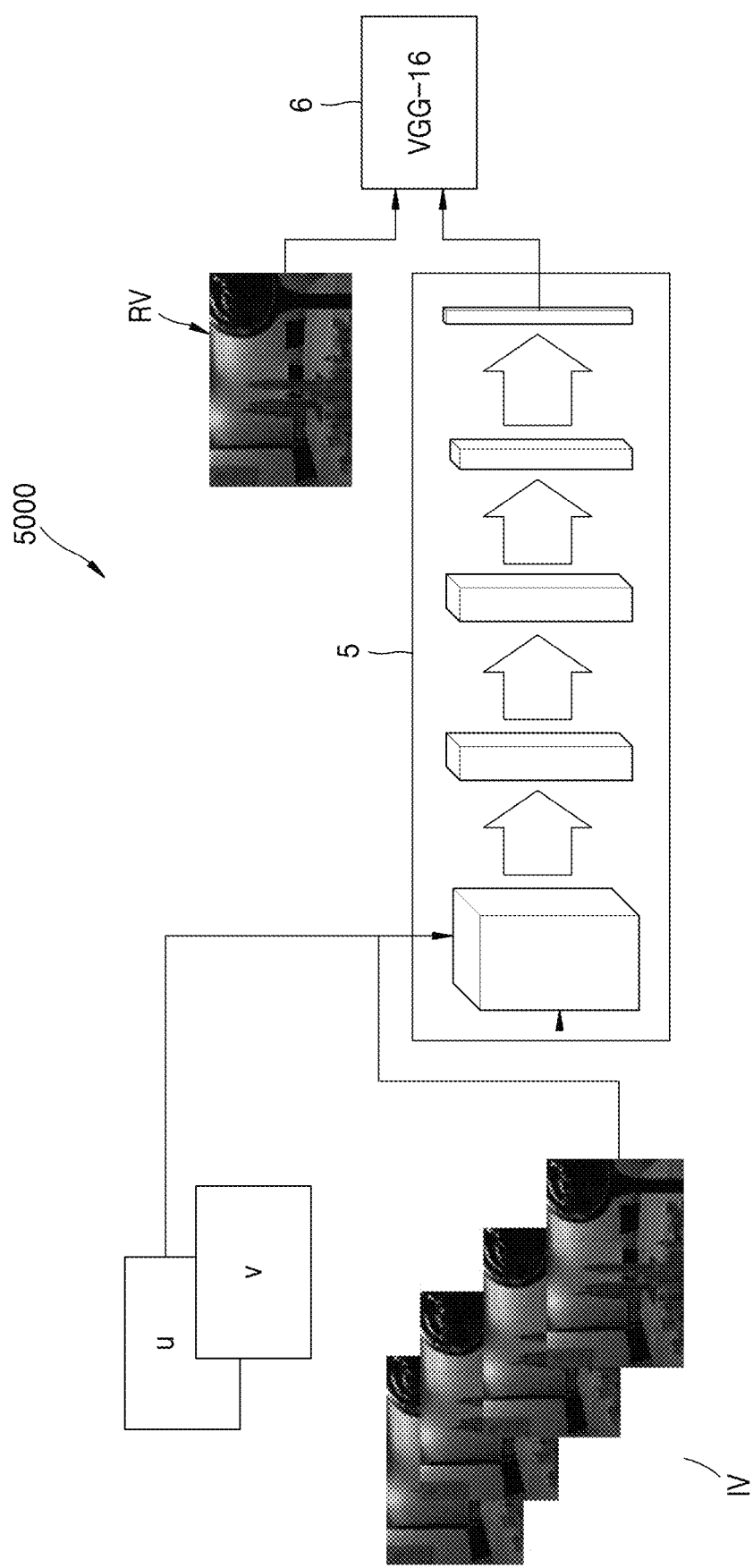
FIG. 15 schematically illustrates a system for synthesizing intermediate views of a light field using a neural network, according to another embodiment

FIG. 15 schematically illustrates a neural network system 5000 for synthesizing intermediate views of a light field using a neural network according to another embodiment. The system of FIG. 15 may generate intermediate views without using a scene disparity map.

The neural network system 5000 may include a first neural network module 5 for synthesizing intermediate views of a scene light field based on the input views IV of a scene light field and the coordinates (u, v) of intermediate views in a scene light field view array, and a second neural network module 6 that is pre-trained to classify objects of a digital image.

The first neural network module 5 may be a convolutional neural network module. The first neural network module 5 may be pre-trained to synthesize intermediate views without a disparity map.

The second neural network module 6 may be any one of VGG-16 (one type of a neural network module that is previously well known) or other classifying neural modules (classifying networks). A neural network module VGG-16 may identify one of 1000 objects (see https://www.quora.com/What-is-the-VGG-neural-network). Furthermore, the VGG-16 may be used to train the first neural network module 5.

Referring to FIG. 15, to train the first neural network module 5, the input views IV of a light field and the coordinates (u, v) of desired intermediate views may be supplied as an input value of the first neural network module 5 (first operation). Next, an intermediate view synthetized by the first neural network module 5 may be transmitted to the second neural network module 6. Simultaneously, a reference view RV having the same coordinates as those of the desired intermediate views synthesized by the first neural network module 5 may be transmitted to the second neural network module 6. The reference view RV is not synthetized, but previously generated, which is an original view existing in a training data set from the beginning. For example, the reference view RV may be generated by a plenoptic camera.

The second neural network module 6 may transmit the desired intermediate views synthetized by the first neural network module 5 and the reference view RV to a space of view features, in which errors are more effectively calculated than the human cognitive perspective. Two view feature maps may be generated at an output of the second neural network module 6. The two view feature maps each may mean an output from one or more layers of the second neural network module 6. Furthermore, the view feature map may be used to calculate an error function. The second neural network 6 may output view feature maps having the same dimension as the desired intermediate views and the reference view RV. The view feature maps may be a basis for calculating an error. To this end, a well-known technology "perceptual loss" may be used. The perceptual loss is disclosed in a non-patent literature ("Perceptual Losses for Real-Time Style Transfer and Super-Resolution>>, Justin Johnson, Alexandre Alahi, Li Fei-Fei, 2016, https://arxiv.org/pdf/1603.08155.pdf).

It is the essence of the neural network system 5000 of FIG. 15 that, to classify images, the intermediate view synthesized by the first neural network module 5 and the separate reference view RV pass through a series of layers of the second neural network module 6. The generated two view feature maps may be compared to each other in a Frobenius norm L2 (https://en.wikipedia.org/wiki/Matrix_norm #Frobenius_norm).

A result by the neural network system 5000 may be a value defined to be a "distance" between a feature map of the view synthesized by the first neural network module 5 and the reference view RV. As the "distance" value increases, the operation of the neural network system 5000 may become unstable. In other words, the value generated by the system neural network 5000 may mean a calculation error in the desired intermediate views synthetized by the first neural network module 5.

Instead of having the first neural network module 5 synthesize a view to be as close as possible to the reference view in terms of the pixel difference similarly to the method of the neural network system 3000 of FIG. 13, the first neural network module 5 of the system 5000 of FIG. 15 may be trained after an error value is generated, to thus reduce an error value. The training principle of the first neural network module 5 is well known, and thus, a detailed description thereof is omitted. Simultaneously as the first neural network module 5 is trained, compared to the reference view RV, the first operation may be repeated until desired parameters of the intermediate view synthesized by the first neural network module 5 is obtained.

In the second operation, the first neural network module 5 is prepared for the synthesis of desired intermediate views having a minimum error, after the training and obtaining of desired synthesis parameters.

A method of synthesizing intermediate views of a light field according to various embodiments of the disclosure may be applied to mobile devices having at least one camera.

A user may quickly make a series of pictures without changing the position of a camera. For example, a small movement of a camera according to a movement of a user's hand may be sufficient to form a necessary number of input views of a light field. Although better quality may be obtained if all pictures are taken, a predetermined number of pictures may be taken by a configuration of a preselected view. The generated input views may be transmitted to a processing module, that is, a component of the mobile device in charge of intermediate view synthesis. Optionally, the processing module may include a sub-module for receiving a disparity map from the depth sensor. Furthermore, a mobile device may be operated according to the operations of generating intermediate views of a light field, transmitting the generated intermediate views of a light field to a memory device, and outputting the generated intermediate views of a light field to a display of the mobile device.

As the resolution of a camera of a modern mobile device is high, each view of a light field generated by the mobile device may have a high resolution. Such an effect may solve a trade-off problem between the angular resolution and the spatial resolution, which is a typical problem of a plenoptic camera.

Although the method of synthesizing intermediate views of a light field, the system for synthesizing intermediate views of a light field, and the method of compressing a light field are described with reference to the embodiments of the drawings to help understanding thereof, this is merely exemplary, and it will be understood by those of ordinary skill in the art that various changes in form and details may be made therein. Accordingly, the scope of the disclosure of the method of synthesizing intermediate views of a light field, the system for synthesizing intermediate views of a light field, and the method of compressing a light field according to the disclosure is defined by the appended claims.

The invention claimed is:

1. A method of synthesizing intermediate views of a light field using a specific configuration of an input view of a light field collected by a light field acquiring device and compressing the light field, the method comprising:
   selecting a configuration of specific input views of the collected light field;
   synthesizing intermediate views of the light field by:
      specifying coordinates of intermediate views to be synthesized and inputting the specified coordinates to a neural network and
      synthesizing intermediate views, using the neural network, based on a scene disparity, a selected configuration of the specific input views, and the specified coordinates of intermediate views;

calculating a difference between at least one intermediate view and the input view; and compressing the difference, wherein the configuration of the specific input views is defined by coordinates of the input view in a light field matrix collected by the light field acquiring device, and wherein the coordinates of the intermediate views are specified from coordinates in an area surrounded by the coordinates of the input views in the light field matrix.

2. The method of claim 1, wherein a size of the light field matrix is M×M, M being a positive number, and the coordinates of the input view correspond to a point included in first and last rows and a point included in first and last columns of the light field matrix having the M×M size.

3. The method of claim 2, wherein, when the M is an odd number, the point denotes a middle point in the row or column, and when the M is an even number, the point denotes a point closest to the middle point in the row or column.

4. The method of claim 1, wherein the coordinates of the intermediate views are expressed by an integer or fraction.

5. The method of claim 1, further comprising:

calculating a light field feature map based on the selected configuration of specific input views of the light field; and calculating the scene disparity using the neural network, based on the light field feature map.

6. The method of claim 1, further comprising previously estimating the scene disparity by using a depth sensor.

7. The method of claim 5, further comprising synthesizing intermediate views using a pre-trained neural network.

8. A system for synthesizing intermediate views of a light field, the system comprising:

a light field view acquiring device configured to:

capture an input view of a light field scene; and select a configuration of specific input views of the light field scene;

a first convolutional neural network configured to synthesize intermediate views based on the input view of the light field scene, a scene disparity, and specific coordinates of the intermediate views in a scene light field view array, wherein the configuration of the specific input views is defined by coordinates of the scene light field view array, wherein the coordinates of the intermediate views are specified from coordinates in an area surrounded by the coordinates of the input views in the scene light field view array, and wherein the system is further configured to calculate a difference between at least one intermediate view and the input view, and compress the difference.

9. The system of claim 8, further comprising:

a first calculation module configured to calculate a light field scene feature map based on the input view of the light field scene;

a second convolutional neural network module configured to calculate a scene disparity based on the light field scene feature map;

a disparity level setting module configured to set a disparity level set of $\{d1, \ldots dL\}$;

a second calculation module configured to calculate a new view with respect to each disparity level using each input view through an equation wherein denotes a color value of a pixel at a position of coordinates $s=(x, y)$ obtained from N input views pi at a specific disparity level dl; and a third calculation module configured to calculate from respective generated views, a feature map indicating two characteristics of an average value of color and brightness of the pixel with respect to the disparity level.

10. The system of claim 8, further comprising a depth sensor configured to provide a depth value used to previously estimate the scene disparity.

11. A mobile device comprising a system for synthesizing intermediate views of a light field, the system performing the method of synthesizing intermediate views of a light field according to claim 1.

* * * * *